J. STEINMAN.
RECIPROCATING CUTTER.
APPLICATION FILED FEB. 7, 1914.
1,164,669.
Patented Dec. 21, 1915.
3 SHEETS—SHEET 1.
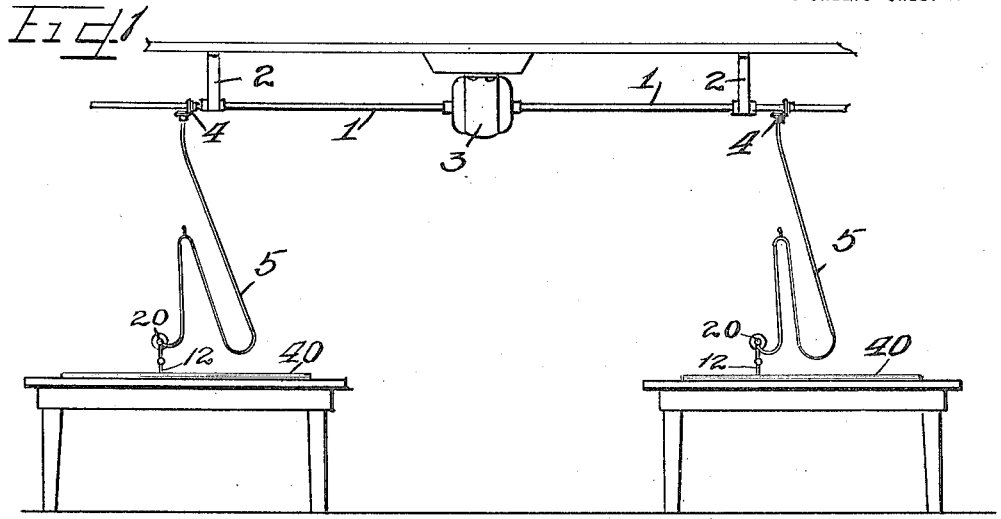
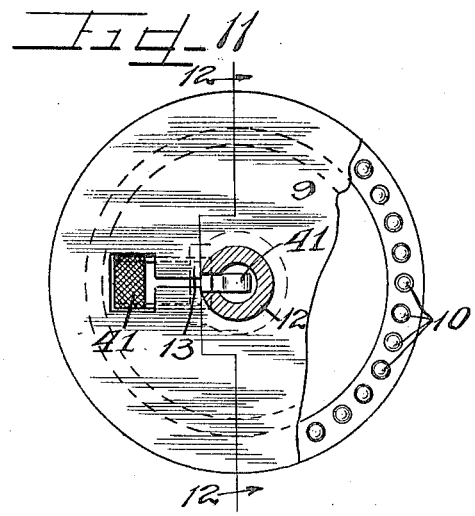
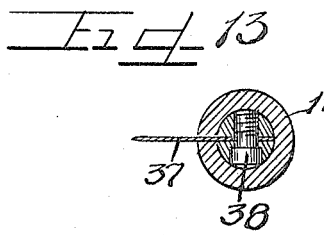
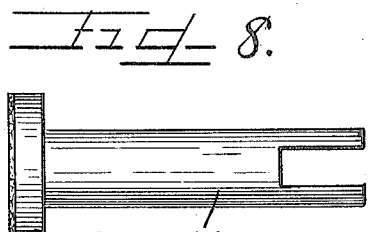
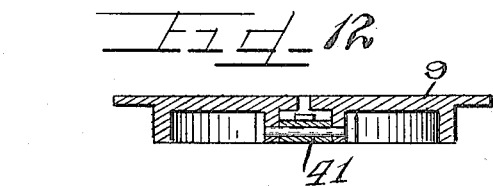
Witnesses
J. W. Angell
Charles W. Tillson Jr.
Inventor
Joseph Steinman.
by Charles W. Tillson
Atty.

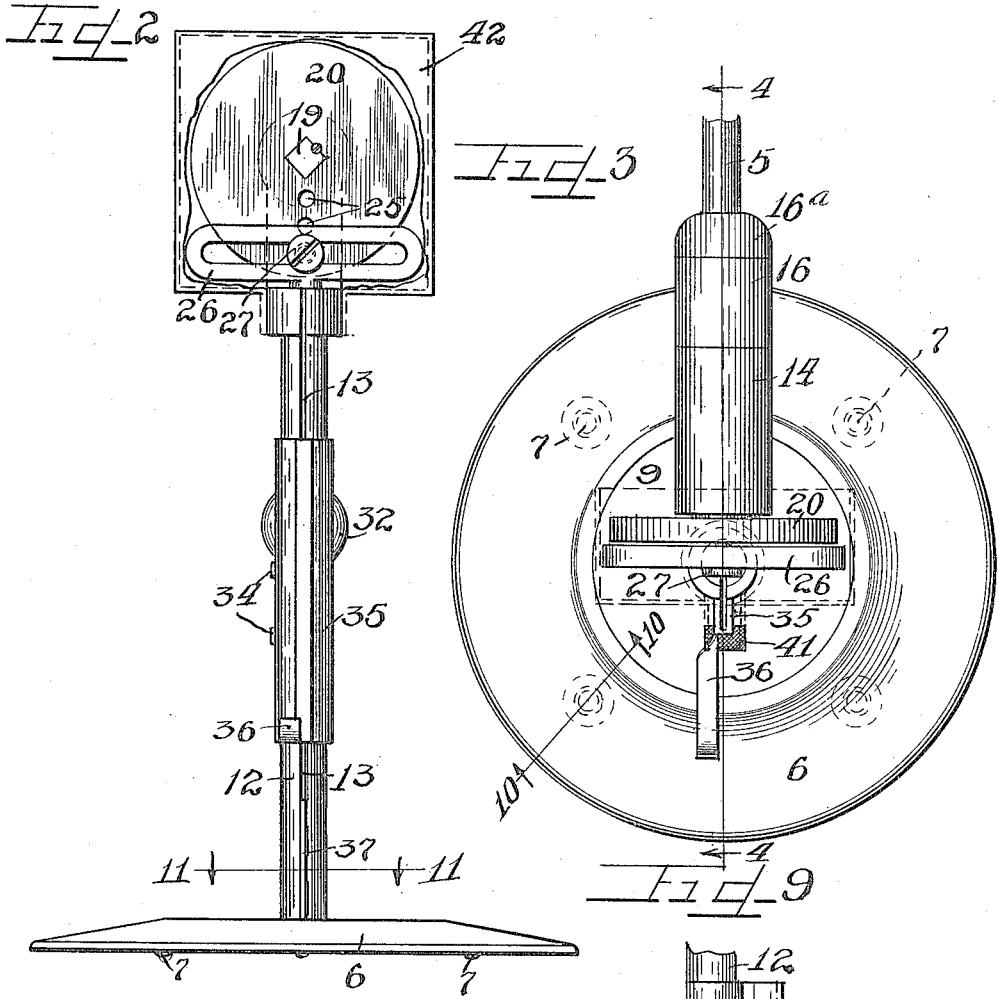

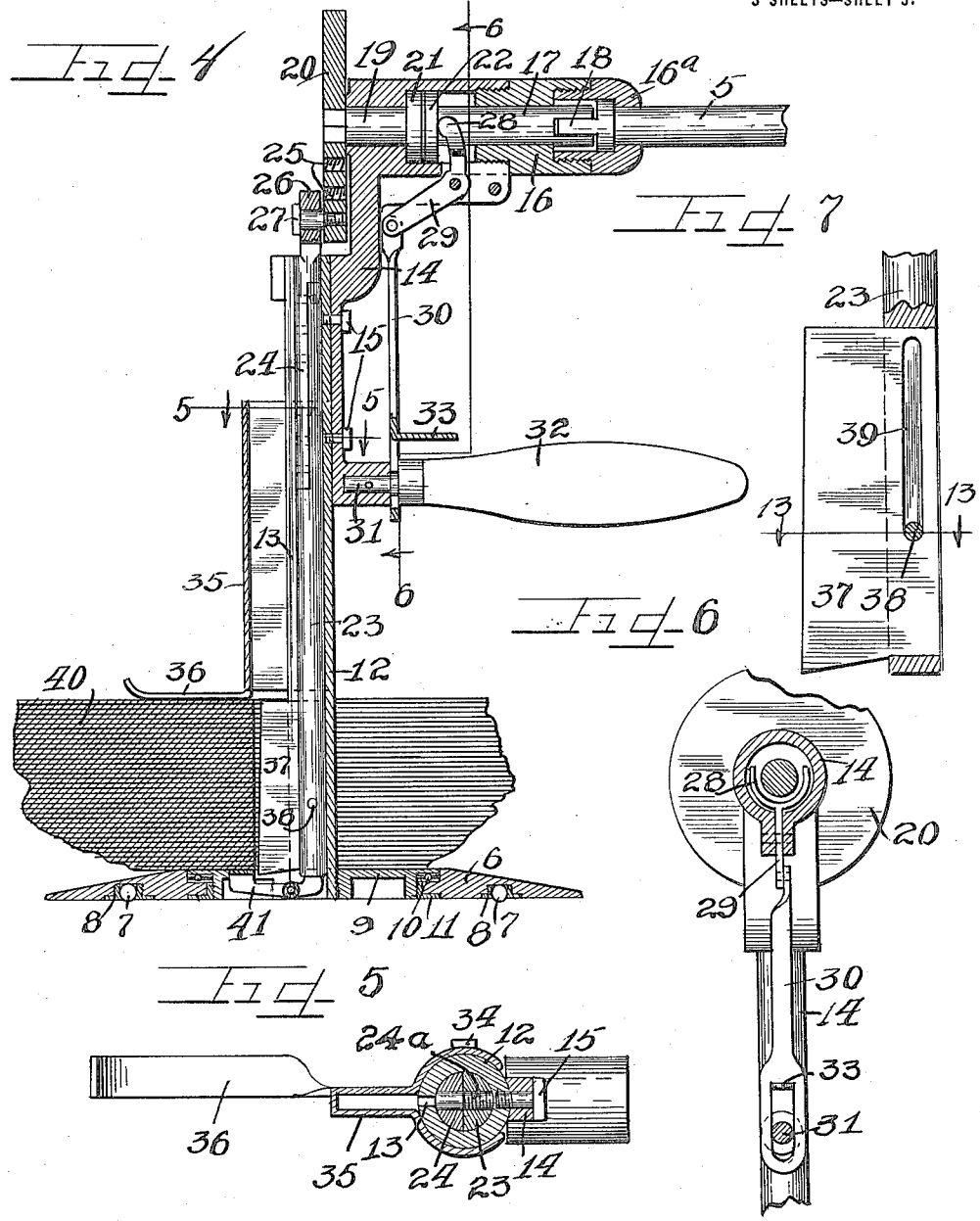

UNITED STATES PATENT OFFICE.

JOSEPH STEINMAN, OF CHICAGO, ILLINOIS, ASSIGNOR, BY MESNE ASSIGNMENTS, TO (MRS.) ETTA VICTOR, OF CHICAGO, ILLINOIS.

RECIPROCATING CUTTER.

1,164,669.  Specification of Letters Patent.  Patented Dec. 21, 1915.

Application filed February 7, 1914. Serial No. 817,112.

*To all whom it may concern:*

Be it known that I, JOSEPH STEINMAN, a citizen of the United States, and a resident of the city of Chicago, in the county of Cook and State of Illinois, have invented certain new and useful Improvements in Reciprocating Cutters; and I do hereby declare that the following is a full, clear, and exact description of the same, reference being had to the accompanying drawings, and to the numerals of reference marked thereon, which form a part of this specification.

In large tailoring establishments the cutting of the fabric, unless done in large quantities, represents an unavoidable loss of time, and overhead expense. Power driven cutters have been constructed adapted to be manipulated by hand to operate through a plurality of layers of cloth, but in most instances as heretofore constructed, they have been cumbersome to an extent precluding easy operation and in particular preventing sharp turns or cuts to be made within a small area.

This invention relates to a friction driven reciprocating cutter adapted to be moved and guided by hand to cut through a plurality of layers of cloth, and capable of being easily manipulated in a restricted area. An almost inherent defect in other cutters placed upon the market has been the inability of the cutting knife to properly sever the lowest layer of fabric where a plurality of layers are cut simultaneously, but in my invention this defect is corrected by positively actuated mechanism for instantaneously thrusting and holding the lower layer upwardly at the moment the knife cuts therethrough.

It is an object of this invention to construct a friction driven reciprocating cloth cutter provided with adjustable means to admit cutting two or more layers of fabric, and with means for changing the amplitude of movement of the cutting knife.

It is also an object of this invention to provide a power driven reciprocating cutter provided with clutch mechanism for connecting and disconnecting the drive, and with a rolling table or base to permit easy movement of the entire device into various positions to cut the cloth.

It is also an object of this invention to construct a friction driven reciprocating cutter having a rolling base with a bushing or sub-base journaled therein, with the cutting knife and guiding foot of the device mounted on said sub-base to permit easy adjustment of the mechanism in a restricted area.

It is furthermore an object of this invention to construct a device mounted upon a rolling table base with the guiding and driving means for a reciprocating knife supported upon a rotatable sub-base mounted in said base and provided with a handle for guiding the same, and with a finger piece adjacent thereto for connecting and disconnecting the drive from the knife.

It is finally an object of this invention to construct a simple device consisting of few parts, practically all of which are adjustable to admit different numbers of layers of fabric to be cut and to vary the amplitude of movement of the knife, and with the parts arranged in a manner requiring little space to admit manipulation in a confined area.

The invention (in a preferred form) is illustrated in the drawings and hereinafter more fully described.

In the drawings: Figure 1 is a conventional illustration illustrating the manner in which two or more similar devices are in use at the same time. Fig. 2 is a front elevation of a device embodying the principles of my invention, showing a casing broken away. Fig. 3 is a top plan view thereof, the casing removed. Fig. 4 is a section taken on line 4—4 of Fig. 3, and showing the device cutting through several layers of fabric. Fig. 5 is a section taken on line 5—5 of Fig. 4. Fig. 6 is a section taken on line 6—6 of Fig. 4. Fig. 7 is a fragmentary detail partly in section illustrating the attaching means for a knife permitting adjustment thereof to compensate for grinding thereof. Fig. 8 is a detail of the slidable clutch or transmission shaft of the device. Fig. 9 is a fragmentary detail in elevation, showing the adjustable mounting for the tracing foot and knife guard. Fig. 10 is a fragmentary section taken on line 10—10 of Fig. 3. Fig. 11 is a section taken on line 11—11 of Fig. 2, illustrating the rotatable sub-base partly broken away which is journaled in the rolling base of the device. Fig. 12 is a section taken on line 12—12 of Fig. 11. Fig. 13 is a section taken on line 13—13 of Fig. 7.

As shown in the drawings: As shown in Fig. 1, where several similar cutting devices are used, a main line shaft 1, may be mounted conveniently on the ceiling by brackets 2, and driven by a motor 3. At the various points on said line shaft co-acting bevel gears 4, serve to drive a flexible shaft 5, which communicates its movement to a cutting device mounted at the end thereof in a manner hereinafter described.

The cutting device comprises a base 6, the peripheral margin of which is tapered or beveled toward the edges to permit the base to be easily inserted beneath a fabric, and for the purpose of easily rolling the same about the cutting table a plurality of balls 7, are provided in the lower surface of the base, and held in position by cages 8, threaded into said base. Mounted centrally within said base, which is preferably circular, as shown in Fig. 3, is a sub-base 9, which is journaled or supported within said base with its upper surface flush therewith by means of a plurality of balls 10, and with a flange ring 11, threaded on the lower portion thereof and engaging in a circular recess in the lower face of the base 6, to hold said sub-base associated with the base 6, at all times. Threaded securely into said sub-base 9, at the center thereof, is a sleeve or tube 12, having a slot 13, extending for the entire length on the front side thereof. Rigidly attached to the upper end of said tube 12, on the side opposite said slot 13, is a bracket 14, with machine screws 15, inserted through apertures therein and threading into said tube 12, serving to afford the connection between said tube and bracket. Threaded into said bracket 14, is an elongated bushing 16, which affords support for a slidable clutch shaft 17, having a slot in the end thereof to receive the squared end 18, of the flexible driving shaft 5, therein. An apertured plug 16ª, is threaded into the end of said bushing 16, to retain the shaft in operative relation. Journaled in said bracket 14, is a short shaft 19, provided on its outer end with a disk 20, and on its inner end with a small friction disk 21. A similar friction disk 22, is provided upon said slidable shaft 17, which, when projected into engagement with said disk 21, serves to transmit the drive from said flexible driving shaft 5, to said large disk 20. A sectional actuating or knife carrying rod is slidably mounted within said tube 12, and consists of a main section 23, which is substantially circular in cross section for its entire length except at the upper end, where it is adjustably connected with a semi-circular section 24, by means of a short bolt 24ª, engaging in one of a number of threaded apertures in each of said sections. Said disk 20, is provided with a plurality of threaded apertures at different radial distances from the center, as denoted by the reference numeral 25, and extending through a yoke 26, formed on the upper end of said rod section 24, is a stud screw 27, adapted to be threaded into any one of said apertures in said disk, whereby the amplitude of movement of the sectional knife carrying rod may be varied. For the purpose of actuating said slidable shaft 17, to move the respective friction driving disks 21 and 22, into engagement with one another, a bell crank having a yoked extension 28, is pivoted on said bracket 14, with the yoke extending partly around said shaft 17, adapted to contact the rear surface of said disk 22, and with an arm 29, forming the other portion of said bell crank loosely and pivotally connected to a vertically movable actuating bar 30. A pin 31, is rigidly secured on the lower end of said bracket 14, affording attaching means for a handle 32, and also a guide for the lower end of said actuating bar 30, which is stamped outwardly to afford a slot to receive said pin 31, therethrough, and with the outwardly stamped portion 33, affording a finger piece for actuating said bar. Adjustably clamped upon said upright tube 12, by means of set screws 34, is an adjustable knife shield or guard 35, provided with a clamping or tracing foot 36, said set screws engaging through longitudinal slots in said guard member to permit the same, when said screws are loosened, to be set at any position above the base 6.

When the device is in use, as shown more clearly in Fig. 4, it is advanced forwardly by means of an operating gripping handle 32. The lower end of said rod section 23, is slotted to receive a cutting knife 37, therein, adapted to be held in position by means of a clamping screw 38, which engages through a slot 39, in said knife. The purpose of connecting the knife blade into the rod section by means of a screw engaging through a slot is to permit the knife to be moved downwardly to its lowest position before being clamped in place after the knife has been ground or sharpened on its lower edge. As the knife blade is raised and lowered, due to the reciprocating movement of the rod section 23, it slides in the slot 13, in the upright tube 12, and then in elevated position is shielded by the guard 35.

When the device is in use, the base 6, is advanced beneath the lower layer of a series of layers of fabric 40, with the tracing or clamping foot 36, bearing on the upper layer thereof. For the purpose of insuring the lowermost layer being cut by the descending knife 37, a pivoted presser foot 41, is mounted in said sub-base 9, with one end of said lever disposed directly beneath the tube 12, to be struck by the descending rod section 23, and the other end of said presser member 41, is provided with a flat knurled surface, which is thrust upwardly against the lowermost layer of the fabric to slightly move and hold the same upwardly while the knife passes therethrough, and of course with an elevation of said rod section 23, immediately dropping downwardly by gravity, so as not to hinder relative movement between the base 6, and the fabric.

The operation is as follows: The device is relatively small and light, and owing to the balls in the base 6, it is easily rolled about a cutting table, the flexible driving shaft 5, interfering in no manner whatsoever with operation of the device. The sub-base or bushing 9, which is also on ball bearings in the base 6, and supports the cutting mechanism, particularly well adapts the device to operation in small or confined space. When the device is in use, it is moved along with the base 6, passing beneath the layers of fabric 40, and with the tracing foot 36, indicating to the operator the proper line of movement, as well as serving to retain the top layers of the fabric properly in position for cutting. The adjustable connection provided between the respective actuating rod sections 23 and 24, allows the knife to be raised or lowered different amounts to properly correspond with the pin and yoke connection of the section 23, with the driving disk 20, inasmuch as said pin and yoke may be connected in the apertures 25, at various distances from the center to vary the throw of the knife. By using a knife with a slot therein, as clearly shown in Fig. 7, I thus acquire a means of adjusting the knife to compensate for the wear due to grinding or sharpening the same, inasmuch as upon replacing the knife blade 37, within the slotted rod 23, the knife always rests against the lower end of the rod and the set screw 38, is then tightened to securely clamp the knife in position.

I have not shown a spring or other connection for withdrawing the friction disks out of engagement when not impelled into engagement by depression of the finger piece 33, inasmuch as the driving engagement is not a positive interlocking of parts, a spring to throw the same out of engagement is not necessary.

The casing 35, affords a guard or shield for the knife when the same is in elevated position during its reciprocating movement, and the casing is adjustable upon the tube 12, as shown by the pin and slot connections in Fig. 9, permitting movement of the same into various positions dependent upon the amplitude of movement of the knife. A casing 42, may be provided attached upon the bracket 14, to inclose the disk 20, and yoke 26, to prevent an operator accidentally coming into contact therewith.

I am aware that various details of construction may be varied through a wide range without departing from the principles of this invention. I therefore do not purpose limiting the patent granted otherwise than necessitated by the prior art.

I claim as my invention:

1. In a device of the class described a sloping base, an upright journaled therein reciprocating mechanism within said upright, a knife carried by said mechanism, an adjustable guard therefor, said knife adapted to cut through layers of cloth partly supported on said base, and a member pivoted in said base adapted to insure cutting of the lower layers of said cloth.

2. A cutting device of the class described comprising a rolling base, reciprocating mechanism rotatably mounted thereon, friction clutch mechanism for connecting said reciprocating mechanism with a source of power, cutting means carried by said mechanism to move therewith, an adjustable casing for said cutting means, and clamping means integral with said casing.

3. In a device of the class described a supporting base, a plurality of operating mechanisms therein, an upright standard mounted on one of said mechanisms, cutting mechanism adapted to reciprocate upon said standard, a drive for said cutting mechanism, and means for guiding the device and connecting and disconnecting said mechanism from said drive.

4. In a device of the class described a base, a sub-base rotatable therein, an upright supported upon said sub-base, reciprocating cutting means mounted on said upright, driving means therefor, means disconnecting the drive therefrom, and a plurality of mechanisms for holding a plurality of layers of fabric in position during a cutting movement of the mechanism.

5. In a device of the class described a base, rollers journaled therein, a sub-base rotatable in said base, a pivoted presser foot for the fabric mounted in said sub-base, reciprocating mechanism mounted upon said sub-base adapted to be moved therewith, a driving disk, adjustable eccentric connections between said reciprocating mechanism and said disk to vary the amplitude of movement of said mechanism, and means connecting and disconnecting the drive for said disk.

6. In a friction driven cutting device a sloping movable base adapted to be thrust along beneath a fabric, a casing member adapted to track over the upper surface of the fabric and to hold the same against said base, reciprocating cutting mechanism to cut through the fabric, and means actuated thereby to thrust the under surface of the fabric upwardly, clamping the same beneath said tracing member when said cutting mechanism descends.

7. In a device of the class described friction driven cutting mechanism comprising a reciprocating knife, means varying the amplitude of movement of said knife, an adjustable mounting for said knife capable of being assembled in different positions to compensate for wear on the knife, and a sectional member supporting said knife and adjustable to compensate for variations in the amplitude of reciprocation thereof.

8. In a cutting machine of the class described a combination adjustable clamp and guard, a pivoted clamp, and cutting means slidable within said guard adapted to cut material held between said clamps.

In testimony whereof I have hereunto subscribed my name in the presence of two subscribing witnesses.

JOSEPH STEINMAN.

Witnesses:
CHARLES W. HILLS, Jr.,
FRANK K. HUDSON.

Copies of this patent may be obtained for five cents each, by addressing the "Commissioner of Patents. Washington, D. C."